No. 754,562. PATENTED MAR. 15, 1904.
R. O. HINTZ.
RAIL BENDER.
APPLICATION FILED JULY 16, 1903.
NO MODEL.
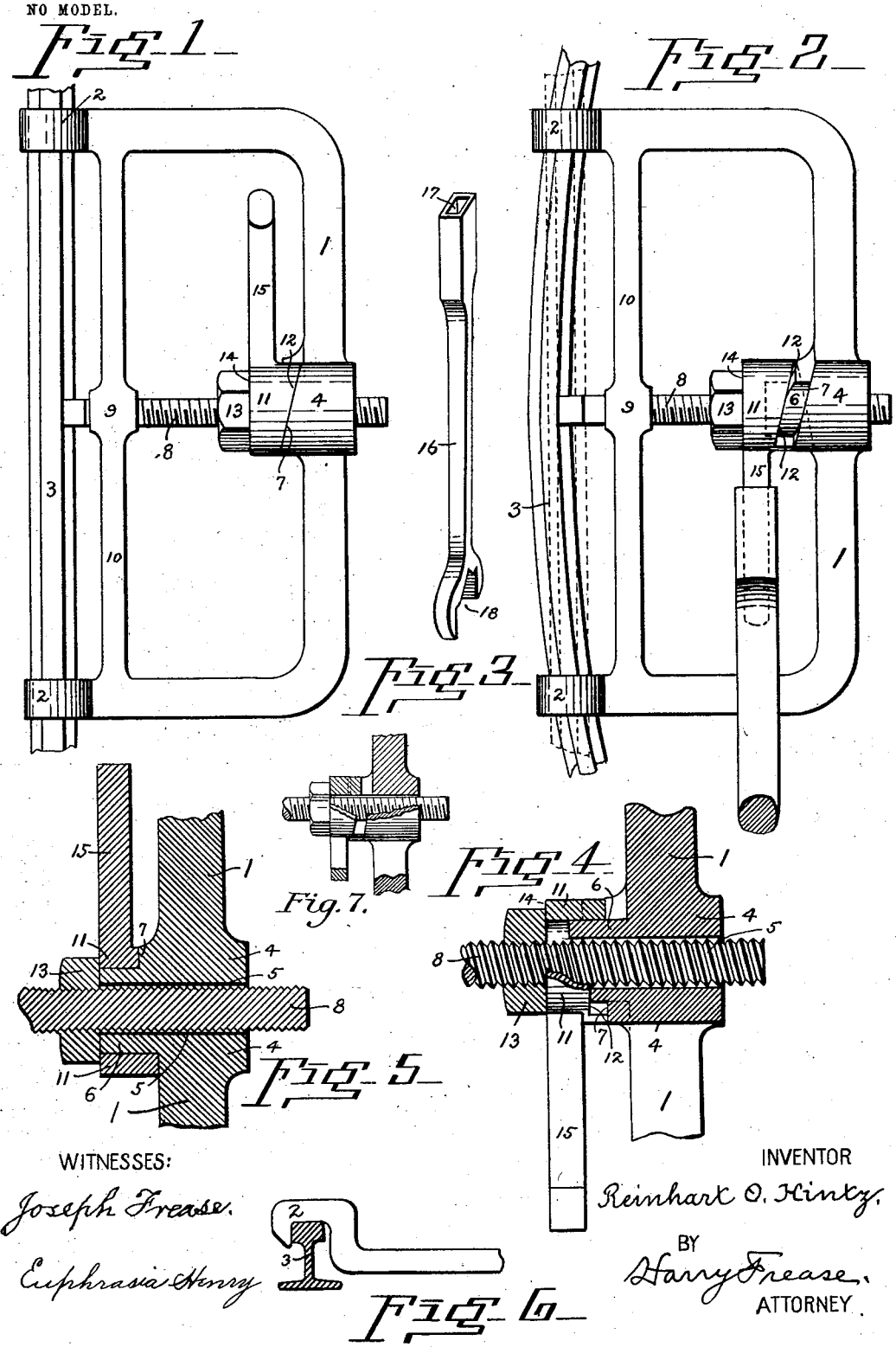

No. 754,562. Patented March 15, 1904.

UNITED STATES PATENT OFFICE.

REINHART O. HINTZ, OF NEAR MASSILLON, OHIO, ASSIGNOR OF ONE-HALF TO JOHN E. ENGLISH, OF MASSILLON, OHIO.

RAIL-BENDER.

SPECIFICATION forming part of Letters Patent No. 754,562, dated March 15, 1904.

Application filed July 16, 1903. Serial No. 165,786. (No model.)

*To all whom it may concern:*

Be it known that I, REINHART O. HINTZ, a citizen of the United States, residing near Massillon, in the county of Stark and State of Ohio, have invented certain new and useful Improvements in Rail-Benders, of which the following is a specification.

The ordinary rail-bender is composed of a U-shaped frame with the ends of its arms bent or hooked to engage the rail, a bending-screw operating in an aperture in the body of the frame with its end abutting against the rail midway between the arms of the frame, and a nut on the bending-screw adapted to operate against the inner side of the frame, whereby the rail is bent by turning the nut on the screw to thrust it against the rail. An objection to this style of a bender is that it requires many partial turns of the nut to move the bending-screw endwise far enough to bend the rail, and after one bend is made the nut must be turned the reverse way the same number of times to free the screw for another action. By the present invention a wedge-collar is inserted between the nut and the frame, whereby after the nut has been adjusted to bring the end of the bending-screw against the rail one partial turn of the wedge-collar suffices to bend the rail enough for ordinary purposes, after which one reverse turn of the collar serves to free the screw for another action. This result is attained by the construction and mechanism illustrated in the accompanying drawings, in which—

Figure 1 is a plan view of the bender as applied to a rail with the parts adjusted for making a bend; Fig. 2, a similar view showing the wedge-collar rotated and the bending accomplished; Fig. 3, a perspective view of a preferred form of wrench; Fig. 4, a horizontal section through the wedge-collar and adjoining parts as situated in Fig. 2; Fig. 5, a similar section of the parts as situated in Fig. 1; Fig. 6, a fragmentary view showing the engagement of one frame-arm with the rail, and Fig. 7 a fragmentary view showing the sleeve omitted from the head.

Similar numerals refer to similar parts throughout the drawings.

The usual U-shaped frame 1 is provided with the hooks 2 on the ends of its arms, which hooks engage the rail 3. The middle of the body of the frame is enlarged to form the head 4, in which head is provided the axial aperture 5, and the sleeve or bushing 6 is preferably formed on the inner side of the head. The inclined or spiral faces 7 are formed on the inner side of the frame-head, of which faces there can be one or more, as may be desired.

The bending-screw 8 is provided with a thread and operates freely endwise in the axial aperture of the frame-head. The guide or bearing 9 for the bending-screw is preferably provided in cross-bar 10, which extends between the frame-arms.

The wedge-collar 11 is mounted to rotate on the sleeve of the head, and on its outer side are provided the inclined or spiral faces 12, which correspond with and operate on the similar faces on the inner side of the frame-head. The adjusting-nut 13 is provided on the bending-screw, which nut is adapted to be turned against the inner flat face 14 of the wedge-collar. The shank 15 is preferably provided on the wedge-collar, whereby the same can be conveniently rotated by a wrench, as 16, which wrench is preferably provided with the socket 17 on one end for the collar-shank and the notch 18 in the other end for the nut. The wedge-collar is normally rotated back, so that its inclined faces are in full contact with the inclined faces on the frame-head, and to operate the bender the hooks of the frame-arms are engaged over the rail and the nut is turned against the flat face of the wedge-collar, so that the end of the bending-screw is brought against the side of the rail, as shown in Fig. 1. The wedge-collar is then rotated, preferably by the wrench, and the action of the inclined or spiral faces on the head and collar forces the collar inward, and by means of the nut the bending-screw is thrust against the rail, which makes the bend. The collar is then turned back to its normal position, which releases the bending-screw and permits it to be brought back to be ready for another bend without any further adjustment of the nut.

The sleeve extending from the head of the frame can be omitted, in which event the wedge-collar is mounted to rotate directly on the bending-screw, as shown in Fig. 7; but I prefer to use the sleeve for the firmer bearings it gives for the collar and also to prevent the threads on the screw from being bruised or abraded by the movements of the collar.

What I claim as my invention, and desire to secure by Letters Patent, is—

1. A rail-bender comprising a frame with arms adapted to engage a rail, a head in the frame having an axial aperture and an inwardly-projecting sleeve, spiral faces on the inner side of the head, a rotatable collar on the sleeve having spiral faces on its outer side corresponding to the similar faces on the head, a bending-screw movable endwise in the axial aperture, and a nut on the screw adapted to be adjusted against the inner side of the collar.

2. A rail-bender comprising a frame, a head in the frame having an axial aperture and an inwardly-projecting sleeve, spiral faces on the inner side of the head, a rotatable collar on the sleeve having spiral faces on its outer side corresponding to the similar faces on the head, a bending-screw movable endwise in the axial aperture, and a nut on the screw adapted to be adjusted against the inner side of the collar.

3. A rail-bender comprising a frame, a head on the frame having an axial aperture, spiral faces on one side of the head, a bending-screw movable endwise in the axial aperture, a nut on the screw, and a rotatable collar between the head and the nut having spiral faces on one side corresponding to the similar faces on the head.

In testimony whereof I have signed my name to this specification in the presence of two subscribing witnesses.

REINHART O. HINTZ.

Witnesses:
HARRY FREASE,
LORIN C. WISE.